US012726609B2

(12) United States Patent
Parker et al.

(10) Patent No.: US 12,726,609 B2
(45) Date of Patent: Sep. 1, 2026

(54) RANKED REFERENCE FRAMEWORK FOR VIDEO CODING

(71) Applicant: Google LLC, Mountain View, CA (US)

(72) Inventors: Sarah Parker, San Francisco, CA (US); Debargha Mukherjee, Cupertino, CA (US); Lester Lu, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 145 days.

(21) Appl. No.: 18/717,407

(22) PCT Filed: Dec. 7, 2022

(86) PCT No.: PCT/US2022/052174
§ 371 (c)(1),
(2) Date: Jun. 6, 2024

(87) PCT Pub. No.: WO2023/107577
PCT Pub. Date: Jun. 15, 2023

(65) Prior Publication Data

US 2025/0047833 A1 Feb. 6, 2025

Related U.S. Application Data

(60) Provisional application No. 63/286,587, filed on Dec. 7, 2021.

(51) Int. Cl.
*H04N 19/105* (2014.01)
*H04N 19/157* (2014.01)
(Continued)

(52) U.S. Cl.
CPC ......... *H04N 19/105* (2014.11); *H04N 19/157* (2014.11); *H04N 19/176* (2014.11); *H04N 19/503* (2014.11); *H04N 19/70* (2014.11)

(58) Field of Classification Search
CPC .... H04N 19/105; H04N 19/13; H04N 19/157; H04N 19/159; H04N 19/176; H04N 19/503; H04N 19/51; H04N 19/70
(Continued)

(56) References Cited

U.S. PATENT DOCUMENTS 11,582,443 B1 * 2/2023 Chaudhari ........... H04N 19/146
2019/0020900 A1 * 1/2019 Chiang .................. H04N 19/96
(Continued)

FOREIGN PATENT DOCUMENTS

JP 2020-523862 A 8/2020

OTHER PUBLICATIONS

International Search Report and Written Opinion of International Application No. PCT/US2022/052174, mailed Mar. 30, 2023, 17 pgs.

(Continued)

*Primary Examiner* — Kathleen M Walsh
(74) *Attorney, Agent, or Firm* — Young Basile Hanlon & MacFarlane. P.C.

(57) ABSTRACT

A new reference framework is described that ranks reference frames based on a normative procedure (e.g., a calculated score) and signals the reference frames based on their ranks. The bitstream syntax is simplified by using a context tree that relies on the ranking. Moreover, mapping reference frames to buffers does not have to be signaled and can be determined at the decoder. In an example, the identifier of a reference frame used to code a current block can include identifying a syntax element corresponding to the identifier, determining context information for the syntax element, determining a node of a context tree that includes the syntax element, and coding the syntax element according to a probability model using the context information associated with the node. The context tree is a binary tree that includes,
(Continued)

as nodes, the available reference frames arranged in the ranking.

20 Claims, 9 Drawing Sheets

(51) Int. Cl.
*H04N 19/176* (2014.01)
*H04N 19/503* (2014.01)
*H04N 19/70* (2014.01)

(58) Field of Classification Search
USPC ..................................................... 375/240.12
See application file for complete search history.

(56) References Cited

U.S. PATENT DOCUMENTS

| | | | | |
|---|---|---|---|---|
| 2019/0110063 | A1* | 4/2019 | Mukherjee | H04N 19/517 |
| 2021/0150728 | A1* | 5/2021 | Ahmed | G06V 10/82 |
| 2023/0093043 | A1* | 3/2023 | Zhao | H04N 19/129 375/240.02 |
| 2023/0156218 | A1* | 5/2023 | Zhao | H04N 19/172 |
| 2023/0328233 | A1* | 10/2023 | Zhang | H04N 19/147 |

OTHER PUBLICATIONS

Bross B et al., 11WD4: Working Draft of High-Efficiency Video Coding; JCT-VC Meeting; Jul. 14, 2011-Jul. 22, 2011; 11-15 Torino; (Joint Collaborative Team on Video Coding of ISO/IEC JTC1/SC29/WG11 and ITU-T SG. 16); Oct. 22, 2011; Retrieved from the Internet: URL:http://phenix.int-evry.fr/jct/doc_end~user/docurnents/6_Torino/wgll/JCTVC-F803-v6.zip JCTVC-F803_d4.doc.

Ye Y et al: “AHG21: Reference picture lists combination syntax”; MPEG Meeting; Feb. 6, 2012-Feb. 10, 2012; San Jose; (Motion Picture Expert Group or ISO/IEC JTC1/SC29/WG11); Feb. 7, 2012.

* cited by examiner 200
202
PROCESSOR
214
STORAGE
218
DISPLAY
212
220
IMAGE-SENSING DEVICE
222
SOUND-SENSING DEVICE
206
210
208
DATA
APPLICATION: 1...
APPLICATION: VIDEO CODING
APPLICATION: ...N
OPERATING SYSTEM
204

300
VIDEO STREAM
302
VIDEO SEQUENCE
304
FRAMES
306
308
308
FRAME
310

P0
1
0
REF RANK 1
P1
1
0
REF RANK 2
P2
1
0
REF RANK 3
P3
1
0
REF RANK 4
P4
1
0
REF RANK 5
P5
1
0
REF RANK 6
REF RANK 7

RANKED REFERENCE FRAMEWORK FOR VIDEO CODING

CROSS-REFERENCE TO RELATED APPLICATIONS

This application claims priority to and the benefit of U.S. Provisional Patent Application Ser. No. 63/286,587, filed Dec. 7, 2021, the entire disclosure of which is incorporated herein by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other coding techniques. These techniques may include both lossy and lossless coding techniques.

SUMMARY

This disclosure relates generally to encoding and decoding video data using reference frames and more particularly relates to encoding and decoding blocks of video frames using a ranked reference framework for reference frames.

An aspect of the teachings herein is a method for coding (i.e., encoding or decoding) an identifier of at least one reference frame used to code a current block of a video frame. The method can include identifying a syntax element to be coded, wherein the syntax element corresponds to the identifier, determining context information for the syntax element, wherein the context information includes those reference frames of available reference frames that were used to code blocks before the current block in a coding order, determining a node of a context tree that includes the syntax element, and coding the syntax element according to a probability model using the context information associated with the node. The context tree is a binary tree that includes, as nodes, the available reference frames arranged in a ranking based on a score calculated for each reference frame using at least one characteristic of the reference frame that indicates whether the reference frame is likely to encode the current block more efficiently than an other reference frame.

In some implementations, the at least one characteristic includes at least two different characteristics.

In some implementations, the method includes determining whether a coding mode for the current block is a single reference coding mode or a compound reference coding mode, and the context tree has a same syntax structure whether the coding mode for the current block is the single reference coding mode or the compound reference coding mode.

In some implementations, the available reference frames included in the context tree include forward reference frames and backward reference frames.

In some implementations, the context tree is a single context tree that includes forward reference frames and backward reference frames, a coding mode for the current block is a compound reference coding mode, the identifier comprises a first identifier of a first reference frame and a second identifier of a second reference frame, identifying the syntax element to be coded comprises identifying a first syntax element that corresponds to the first identifier and identifying a second syntax element that corresponds to the second identifier, determining the node comprises determining a first node of the single context tree that includes the first syntax element and determining a second node of the single context tree that includes the second syntax element, determining the context information for the syntax element comprises determining first context information for the first syntax element and determining second context information for the second syntax element, and coding the syntax element comprises coding the first syntax element according to a first probability model using the first context information and coding the second syntax element according to a second probability model using the first context information.

In some implementations, the at least one characteristic comprises a quality level of the reference frame of the available reference frames being ranked and a temporal distance of the reference frame from the video frame including the current block.

In some implementations, a frame header of the video frame including the current block includes a mask with a bit-length equal to a cardinality of the available reference frames, the mask indicating which of the available reference frames the current block may use for inter-prediction and which of the available reference frames the current block may not use for inter-prediction.

Another aspect of the teachings herein is a method for decoding a current block of a video frame. The method can include ranking a list of available reference frames according to at least one characteristic of each reference frame, decoding, from a block header of the current block, an identifier of at least one reference frame used to encode the current block using a context tree, and decoding the current block using the at least one reference frame. The context tree is a single binary tree having nodes arranged from a highest ranked reference frame of the available reference frames to a lowest ranked reference frame of the available reference frames.

In some implementations, the at least one characteristic of each reference frame indicate whether the reference frame is likely to encode the current block more efficiently than an other reference frame.

In some implementations, the at least one characteristic comprises at least two of a temporal distance from the video frame that includes the current block, a quality or quantization level of the reference frame, a number of times the reference frame has been selected for inter-prediction, or gradient information of the reference frame.

Yet another aspect of the teachings herein is a method for encoding a current block of a video frame. The method can include ranking a list of available reference frames based on a score calculated for each reference frame using at least one characteristic of the reference frame that indicates whether the reference frame is likely to encode the current block more efficiently than an other reference frame, encoding the current block using at least one reference frame of the available reference frames, and encoding, into a block header of the current block, an identifier of at least one reference frame used to encode the current block using a context tree. The context tree is a single binary tree having nodes arranged from a highest ranked reference frame of the available reference frames to a lowest ranked reference frame of the available reference frames.

In some implementations, encoding the current block includes encoding the current block multiple times using a single reference coding mode and each of the available reference frames excluding at least the lowest ranked reference frame, and selecting the at least one reference frame as the single reference frame of the available reference frames with the highest coding efficiency.

In some implementations, encoding the current block using at least one reference frame comprises encoding the current block using two reference frames, and encoding the identifier includes encoding a first identifier of a first reference frame of the two reference frames using the single binary tree and encoding a second identifier of a second reference frame of the two reference frames using the single binary tree.

In some implementations, the available reference frames of the single binary tree include forward reference frames and backward reference frames.

Apparatuses are also described that can perform any of these methods.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings described below wherein like reference numerals refer to like parts throughout the several views.

DETAILED DESCRIPTION

Figure 1:
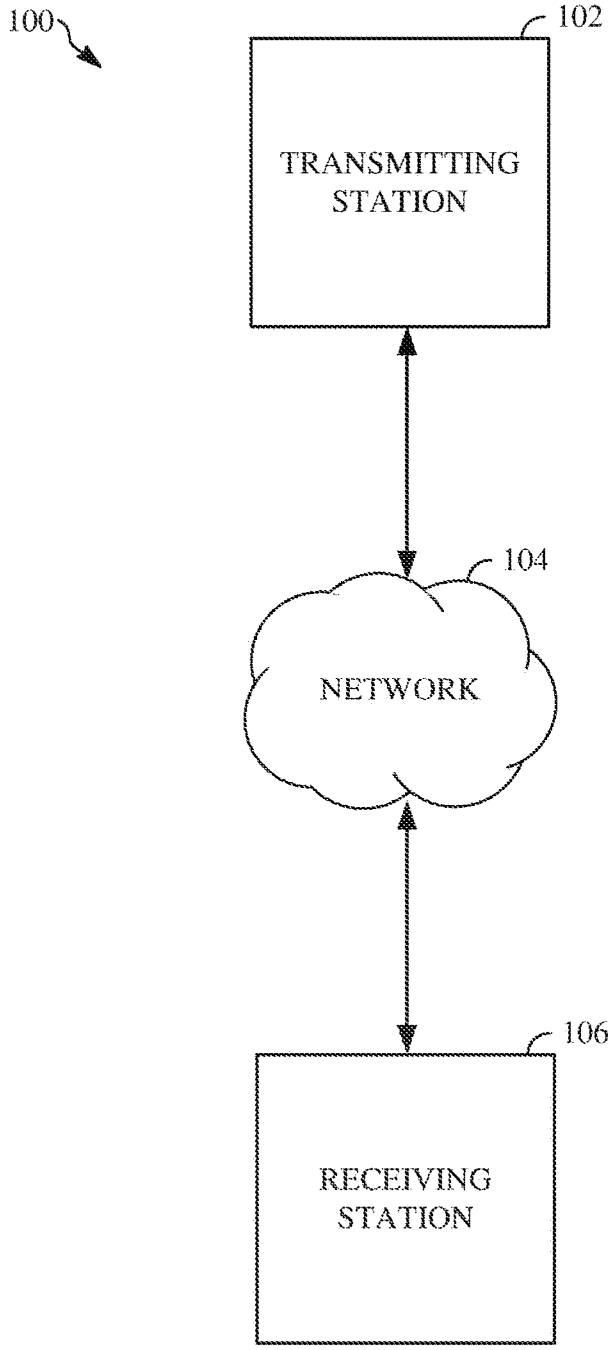
FIG. 1 is a schematic of a video encoding and decoding system.

Compression schemes related to coding video content (e.g., video streams, video files, etc.) may include breaking each image into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal and spatial similarities in the video stream to improve coding efficiency. For example, temporal similarities may be exploited in encoding a current block of a current frame by predicting motion and color information for the current block based on previously encoded pixels of one or more other frames and identifying a difference (residual) between the predicted values (prediction block) and the current block. In this way, only the residual and the parameters used to generate the prediction block need be added to the bitstream instead of including the entirety of the current block. This technique may be referred to as inter prediction.

This process of generating prediction blocks of pixels in a current frame from other frames in the video sequence includes maintaining a set of reference frames. A reference buffer management system or scheme used to maintain the set may involve many decisions, such as deciding which frames to keep as references, when to discard references in favor of new ones, the number of references available to a current frame or prediction unit (e.g., a block), how to signal which reference is used for the prediction unit, and how to efficiently search relevant references in the buffer pool for prediction. The design of this scheme aids good block prediction (e.g., a prediction block that closely matches the current block being encoded), and a high level of flexibility in this scheme allows full use of what the bitstream specification of a particular codec will allow.

There are several known reference buffer management systems or schemes (also referred to as reference picture management schemes), each associated with a codec. For example, H.265/HEVC orders its reference picture list based on a display order of the reference frames. This ordering provides for a relatively simple scheme for maintaining, updating, and signaling the reference frames. However, the use of distance alone to order the reference picture list can result in some coding inefficiencies in signaling the reference frames.

In contrast, the reference buffer management scheme of VP9 allows a prediction unit to choose from three possible reference frames that can be dynamically selected from a pool of eight frame buffers. These three possible reference frames are respectively named (e.g., labeled or otherwise identified, etc.) as LAST, GOLDEN, and ALTREF. AV1 also uses dynamic referencing in its reference buffer management scheme that selects reference frames from a pool of eight frame buffers. In AV1, however, there are seven possible references for a prediction unit. These seven possible reference frames are respectively named (e.g., labeled or otherwise identified, etc.) as LAST, LAST2, LAST3, GOLDEN, BWDREF (or ALTREF3), ALTREF2, and ALTREF. These may be referred to as reference frame names or labels herein. While the dynamic reference buffer management scheme of each of these two latter codecs allows for flexibility for the selection of reference frames for efficient coding, the label-based identification of the buffers implies certain qualities or statistics about the associated reference frames as described in additional detail below. These qualities or statistics may not accurately reflect the actual reference frame associated with a respective reference frame label. Further, the label-based identification results in complexity in signaling the reference frames.

This disclosure describes implementations of a reference frame management scheme that relies on a rank-ordered list of n possible references. The ranking may be performed using a heuristic designed to determine the usefulness of each possible reference frame, its likelihood in being a good choice for predicting blocks in the current frame (e.g., its likelihood of minimizing the residuals for the blocks), or some combination thereof. The heuristic considers multiple frame statistics including or instead of distances of the reference frames from the current frame, which may improve coding efficiency over existing techniques. Further, the reference frame management scheme is simplified and flexible as compared to those using label-based identification for reference frames.

Further details of the reference frame management scheme are described herein with initial reference to a system in which it can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
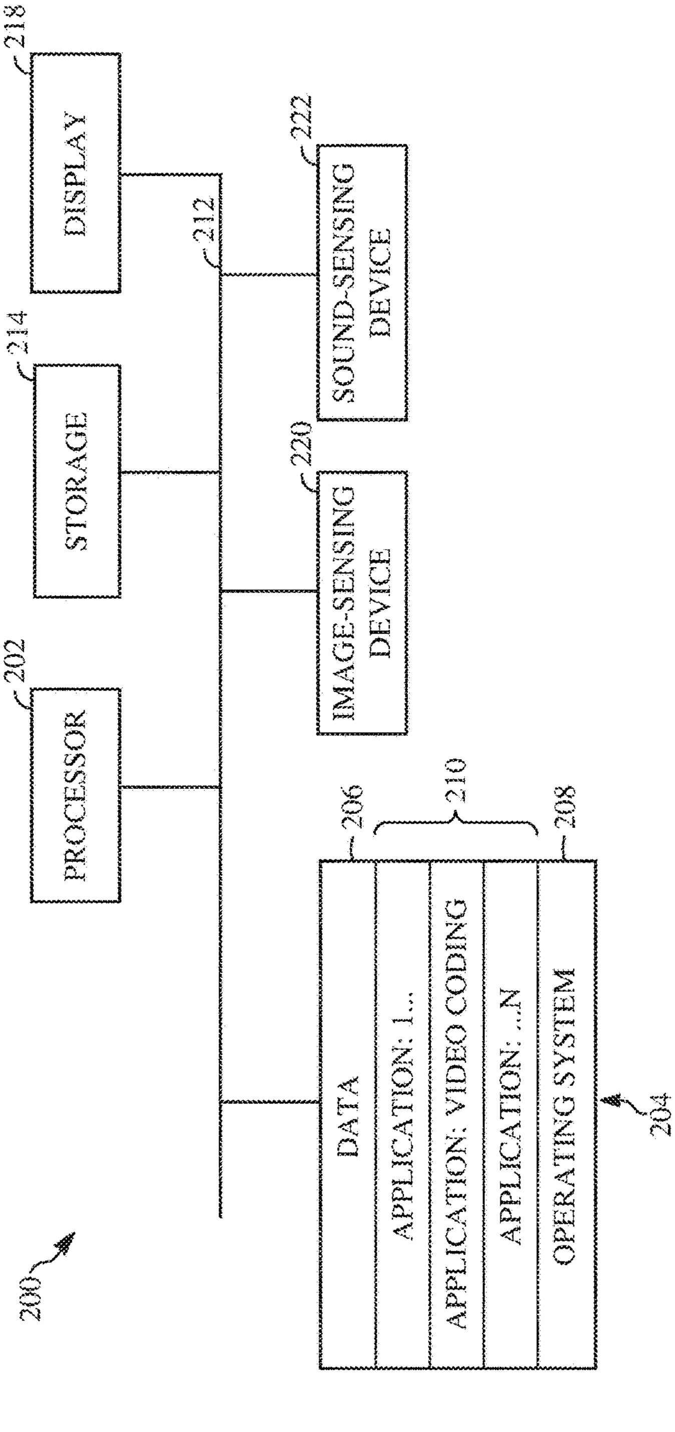
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., the Hypertext Transfer Protocol (HTTP) video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 (e.g., an apparatus) that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random-access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here.

Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device

222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
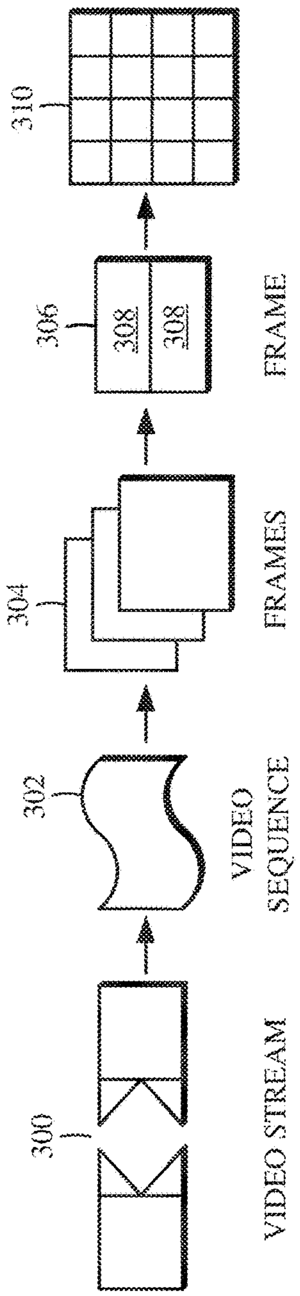
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
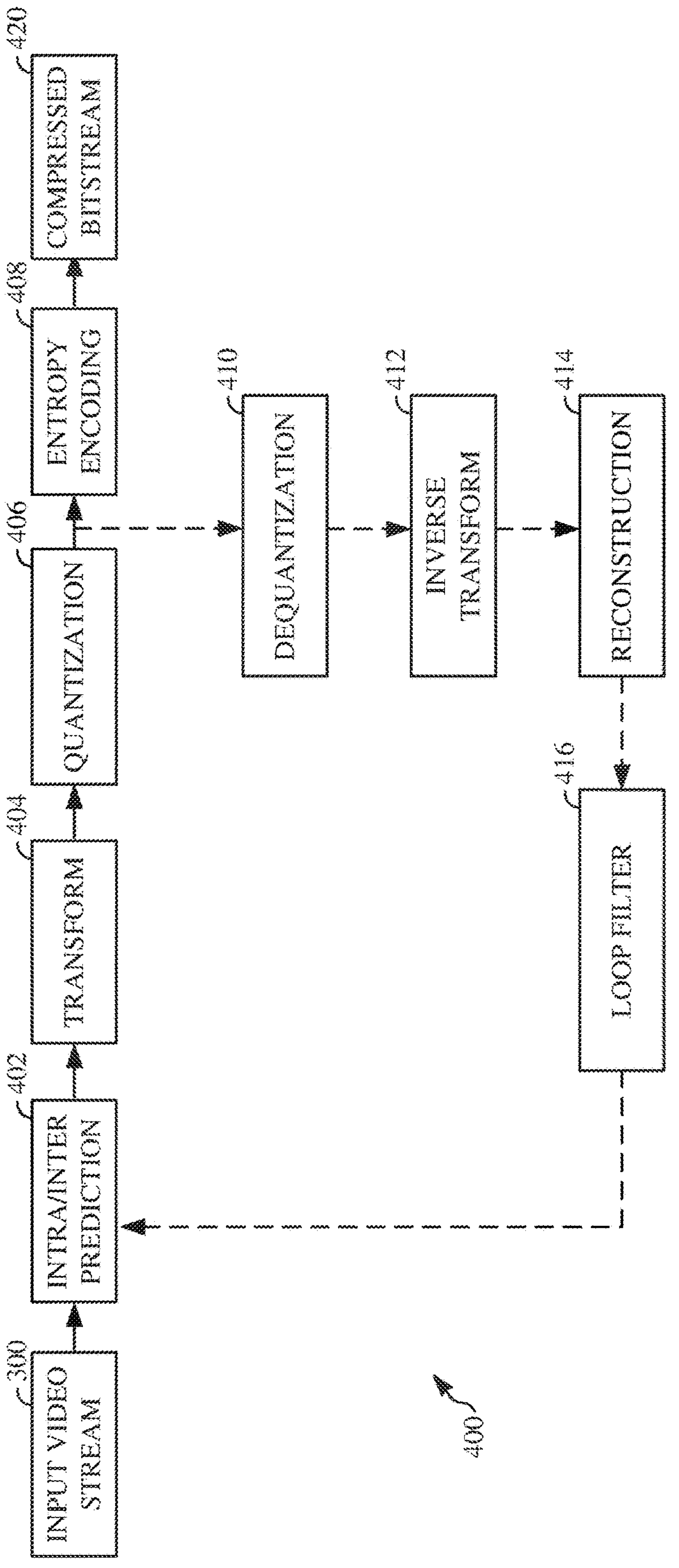
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs similar functions to those that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform-based encoder can quantize the residual signal directly without the transform stage 404 for certain blocks or frames. In another implementation, an encoder can have the quantization stage 406 and the dequantization stage 410 combined in a common stage.

Figure 5:
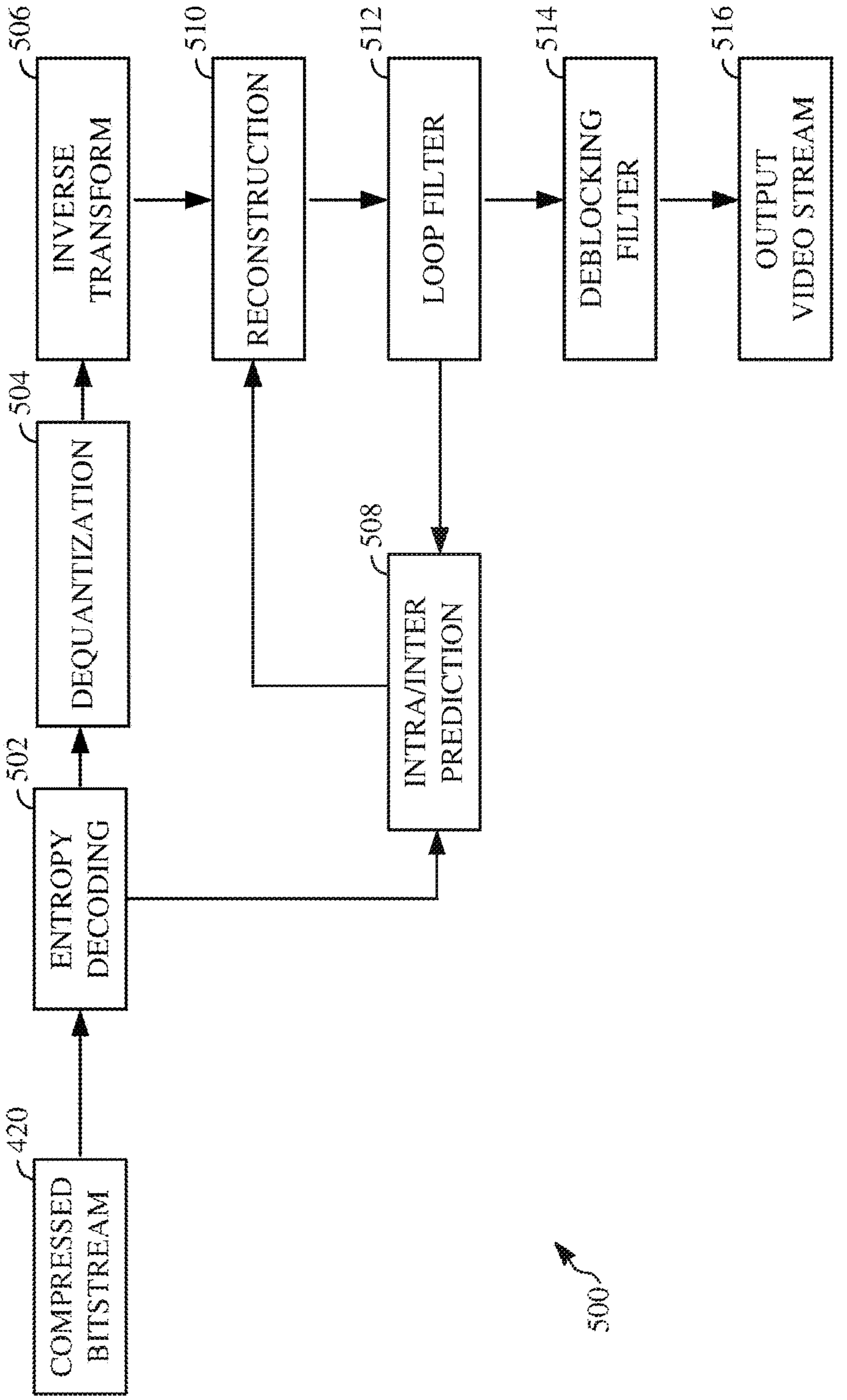
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
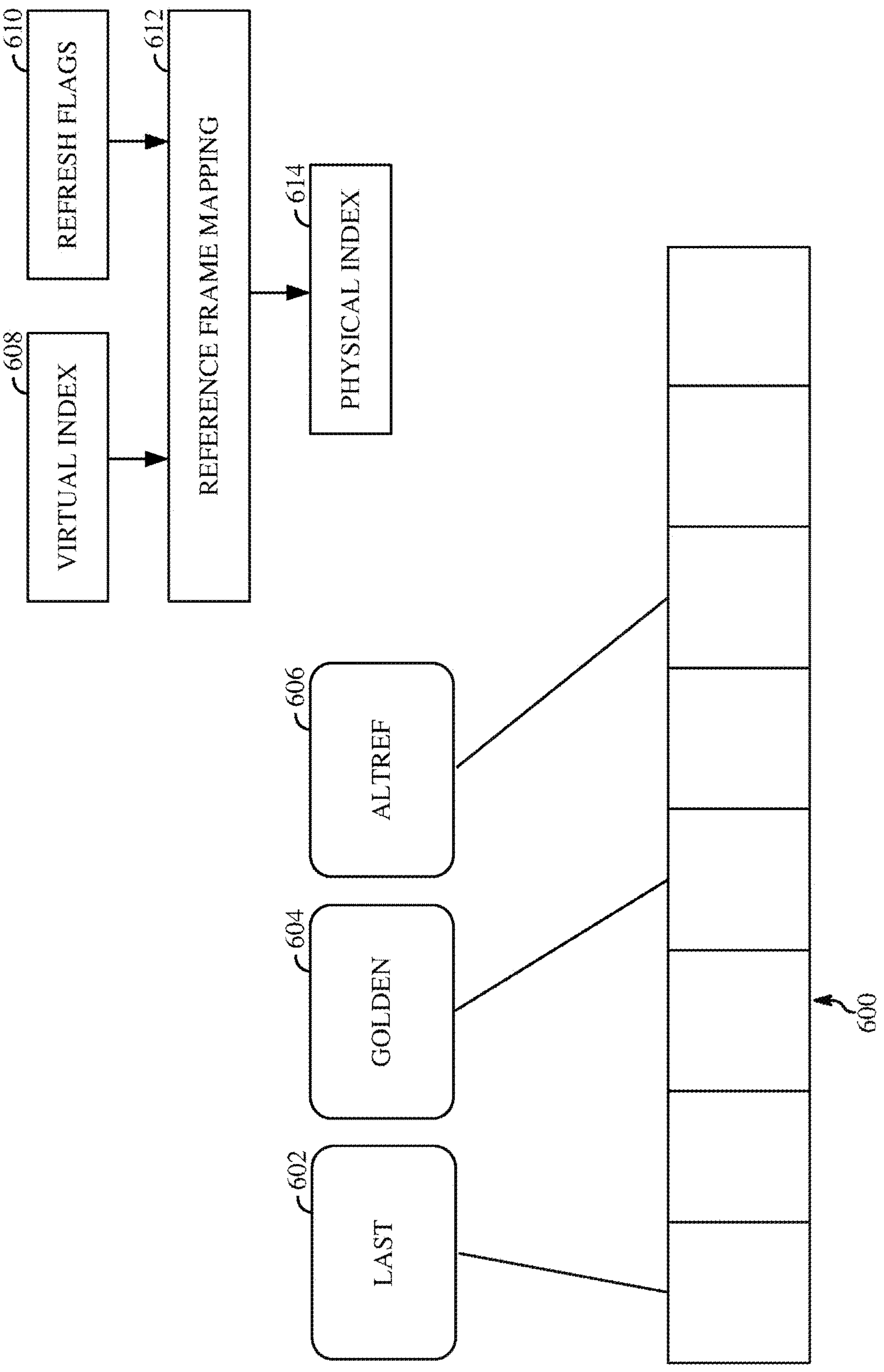
FIG. 6 is a block diagram of an example of a reference frame buffer.

FIG. 6 is a block diagram of an example of reference frame buffers 600 that can maintain up to eight buffers. The reference frame buffers 600 store reference frames used to encode or decode blocks of frames of a video sequence. In this example, labels, roles, or types may be associated with or used to describe different reference frames identified (e.g., associated, stored, etc.) with respective buffers of the reference frame buffers 600.

The frame header of a current reference frame can include a virtual index 608 to a location within the reference frame buffers 600 at which the reference frame is stored. A reference frame mapping 612 can map the virtual index 608 of the reference frame to a physical index 614 of memory at which the reference frame is stored. One or more refresh flags 610 can be used to remove one or more of the stored reference frames from the reference frame buffers 600, for example, to clear space in the reference frame buffers 600 for a new reference frame, where there are no further blocks to encode or decode using the stored reference frames, where a new key frame is encoded or decoded, or some combination thereof. In an example of the frame level reference syntax, a (e.g., 8-bit) flag indicates which of the buffers of the reference frame buffers 600 to refresh with the current frame. Another component of the frame level reference syntax is a list of values indicating a mapping of buffers to named reference assignments. In this example, reference frames are assigned, named, identified, or otherwise designated as LAST frame 602, a GOLDEN frame 604, and an alternative reference (ALTREF) frame 606.

Figure 7:
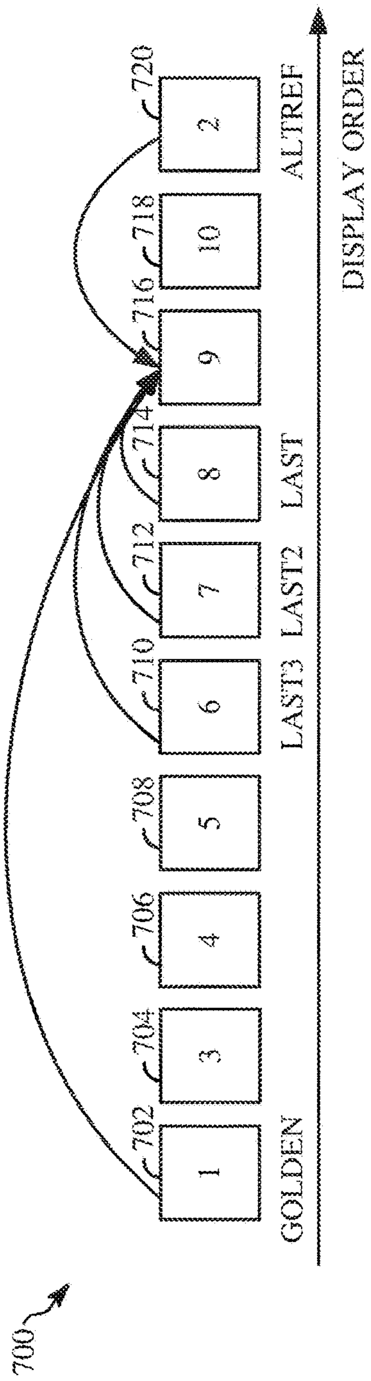
FIG. 7 is a diagram of an example of a one-layer coding structure.

Generally, a group of frames of a video sequence that has a display order may be coded starting with a key frame. A key frame is a frame that is coded without reference to any other frame (e.g., its blocks are coded using intra-prediction). When the term coded or any of its variations is used herein, the term refers to either encoding or decoding unless otherwise clear from context that it refers to only one of encoding or decoding. The key frame, once reconstructed, is available as a reference frame for coding blocks of one or more subsequent frames of the group coded in a coding order, which may be different from the display order. FIG. 7 is a diagram of an example of a one-layer coding structure 700 that can be used to explain the group of frames is coded. In FIG. 7, more than three named references can be dynamically selected from a pool of eight buffers, such as the reference frame buffers 600.

An encoder, such as the encoder 400 of FIG. 4, can encode a group of frames according to the one-layer coding structure 700. A decoder, such as the decoder 500 of FIG. 5, can decode the group of frames using the one-layer coding structure 700. The decoder can receive an encoded bitstream, such as the compressed bitstream 420 of FIG. 5. In the encoded bitstream, the frames of the group of frames can be ordered (e.g., sequenced, stored, etc.) in the coding order of the one-layer coding structure 700. The decoder can decode the frames in the one-layer coding structure 700 and display them in their display order. The encoded bitstream can include syntax elements that can be used by the decoder to determine the display order.

The group of frames of FIG. 7 is shown in the display order of frame 702, frame 704, frame 706, frame 708, frame 710, frame 712, frame 714, frame 716, frame 718, and frame 720. The numbers in the boxes indicate the coding order of the frames. As mentioned previously, a group of frames of a video sequence for coding generally starts with a key frame. The key frame, once reconstructed, is available as a reference frame for coding blocks of one or more subsequent frames of the group coded in the coding order. The indication that a frame is a key frame (e.g., in the header of the frame) may result in a command to refresh all frames for coding, such as refreshing all frames of the reference frame buffers 600. There are up to five named reference frames for inter-prediction, namely GOLDEN, ALTREF, LAST, LAST2, and LAST3 as described in more detail below.

In this example, the frame 702 is a key frame. The reconstructed key frame 702 may be identified as the GOLDEN frame. For example, the reconstructed key frame 702 may be assigned to a buffer using an 8-bit bitmap indicating which of 8 buffers to refresh with the current frame (e.g., the reconstructed key frame 702), and a 3-bit index thereof may be used to map the buffer to the named reference slot GOLDEN. The GOLDEN frame may be used to code subsequent frames in the group. For example, the next frame in the coding order may be a frame that is a defined number of frames ahead of the key frame 702 in the display order, e.g., a future frame. In FIG. 7, the second frame in the coding order is the frame 720, which is the final frame in the group of frames. Blocks of the frame 720 may use the GOLDEN frame for inter-prediction. The reconstructed frame 720 may be identified as the ALTREF frame and may be temporally filtered.

The third frame in the coding order in FIG. 7 is the frame 704, which is the second frame in the display order. Blocks of the frame 704 may use the GOLDEN frame, the ALTREF frame, or both, for inter-prediction. The reconstructed frame 704 may be identified as the LAST frame for coding the next frame in the display order—the frame 706, which is also the next frame in the coding order. The frame 706 has the GOLDEN frame, the ALTREF frame, and the LAST frame available for inter-prediction. Where there are more than three named reference slots the reconstructed frame 706 may be identified as a reference frame. In this example, the frame header reference syntax may refresh the buffers so that the reconstructed frame 706 is identified at the LAST frame for coding the next frame in the display order—the frame 708, which is also the next frame in the coding order—and so that the reconstructed frame 704 is identified as the LAST2 frame. The frame 708 has the GOLDEN frame, the ALTREF frame, the LAST frame, and the LAST2 frame available for inter-prediction. For coding the frame 710, the frame header reference syntax may refresh the buffers so that the reconstructed frame 708 is identified at the LAST frame, the reconstructed frame 706 is identified as the LAST2 frame, and the reconstructed frame 704 is identified as the LAST3 frame.

This process of refreshing the buffers and coding the frames continues. As shown by the arrows in FIG. 7, for example, the frame 702 identified as the GOLDEN frame, the frame 720 identified as the ALTREF frame, the frame 714 identified as the LAST frame, the frame 712 identified as the LAST2 frame, and the frame 710 identified as the LAST3 frame are available for coding blocks of the frame 716. Coding is complete when the last frame in the coding order is coded.

FIG. 7 is an example with only one future frame for backwards prediction, namely the frame 720 identified as the ALTREF frame. Other coding structures can be used to code a group of frames that use additional reference frames including, for example, additional future frames (e.g., relative to the current frame) such as ALTREF2 and BWDREF. In some implementations, a multi-layer coding structure may be used.

A prediction unit of a frame, referred to as a current block in these examples, may be predicted at the intra/inter prediction stage 402 using inter-prediction as described above with regards to the example of FIG. 4. Inter-prediction may comprise a single reference frame prediction mode or a compound reference frame prediction mode. In some implementations, up to seven reference frames may be available coding a block using the single reference frame prediction mode or the compound reference frame prediction mode. With respect to the compound reference frame prediction mode, combinations of reference frames with respective motion vectors may be used. In an example, any two reference frames may be used in the compound reference frame prediction mode. As such, any combination of two out of the seven available reference frames (e.g., 28 possible combinations) may be used. In another example, only a subset of all possible combinations may be valid (e.g., used for coding a current block).

When encoding the current block into a bitstream, such as the bitstream 420, the parameters and/or identifiers of the parameters used to encode the current block (e.g., syntax elements), such as the motion vectors and reference frames, are entropy coded, such as at entropy encoding stage 408. Some common techniques for entropy coding consider the context of (e.g., values related to) the current block and often consider that of neighboring blocks. Herein, context-adaptive binary arithmetic coding (CABAC) is used to describe examples of the teachings of the present invention. However, the invention is not so limited, and the teachings may be applied to other entropy coding schemes that use contexts, including for example context-adaptive variable length coding (CAVLC) and those that use non-binary context trees.

In general, CABAC encodes these block-level syntax elements as binary symbols and allows probability modelling for more frequently used bits of any symbol. The probability models are selected adaptively based on local context (e.g., from nearby elements), allowing better modelling of probability estimates. Local context for probability modelling of syntax elements corresponding to reference frames relates, for example, to whether and how many adjacent blocks are coded using the single reference frame prediction mode as compared to the compound reference frame prediction mode, and to how many and which reference frames are used to code the adjacent blocks.

The named reference buffers or slots are meant to indicate certain qualities or statistics about the associated reference frame. For example, LAST, LAST2, LAST3, and GOLDEN are assumed to be past reference frames in increasing distance from the current frame in the display order of the group of frames or pictures in the video sequence, while BWDREF, ALTREF2, and ALTREF are assumed to be future reference frames in increasing display order from the current frame. As discussed initially, a reference buffer management scheme that uses named slots or buffers can result in coding inefficiencies. One reason for this is because there is no guarantee that the reference frame identified with a particular named slot has the properties the name is intended to indicate. This can be illustrated with reference to coding reference frames as syntax elements at the block level.

Figure 8:
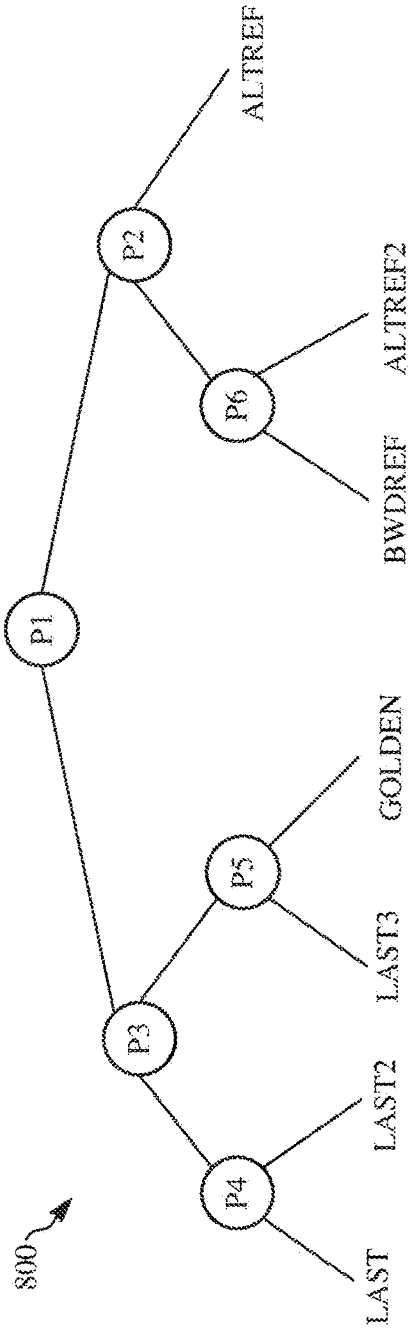
FIG. 8 is a diagram of an example of a context tree for entropy coding the reference frame identifier for a block encoded using a single reference prediction mode.

Initially, there is a different syntax where the current block is coded using a compound reference prediction mode as compared to a single reference prediction mode. The bitstream may signal, e.g., by a flag in a block header, if the mode is the single reference prediction mode or the compound reference prediction mode. FIG. 8 is a diagram of an example of a context tree for entropy coding the reference frame identifier for a block encoded using a single reference prediction mode. The context tree 800 describes a binary code for each possible reference frame slot. Each node P1-P6 of the context tree is an entropy coded bit with a different probability model (e.g., a cumulative distribution function) and context. In other words, each node P1-P6 represents a different method of computing the context for the particular binary decision at the node P1-P6.

The context may be determined using information for blocks adjacent to the current block. The adjacent blocks may be blocks physically or temporally adjacent to the current block and coded before the current block. In some implementations, the adjacent blocks can be one or more blocks to the left of the current block as arranged in the current frame, one or more blocks above the current block as arranged in the current frame, one or more blocks in the previous frame that are co-located with the current block, or some combination thereof.

Initially, the cardinality of forward reference frames (i.e., LAST, LAST2, LAST3, GOLDEN in this example) used for coding the adjacent blocks and the cardinality of backward reference frames (i.e., BWDREF, ALTREF2, ALTREF in this example) used for coding the adjacent blocks may be compared at node P1. The cardinality of forward reference frames used for coding the adjacent blocks may be determined by summing each instance where an adjacent frame uses any one of LAST, LAST2, LAST3, or GOLDEN. The cardinality of backward reference frames used for coding the adjacent blocks may be determined by summing each instance where an adjacent frame uses any one of BWDREF, ALTREF2, or ALTREF. The context value may be set to 0 where the cardinality of forward reference frames is less than the cardinality of backward reference frames, the context value may be set to 1 where the cardinality of forward reference frames is equal to the cardinality of backward reference frames, and the context value may be set to 2 where the cardinality of forward reference frames is greater than the cardinality of backward reference frames.

The cardinality of BWDREF and ALTREF2 reference frames used for coding adjacent blocks and the cardinality of ALTREF reference frames used for coding the adjacent blocks may be compared at node P2. The context value may be set to 0 where the cardinality of BWDREF and ALTREF2 reference frames is less than the cardinality of ALTREF reference frames, the context value may be set to 1 where the cardinality of BWDREF and ALTREF2 reference frames is equal to the cardinality of ALTREF reference frames, and the context value may be set to 2 where the cardinality of BWDREF and ALTREF2 reference frames is greater than the cardinality of ALTREF reference frames. The remaining nodes of the context tree 800 may be similarly considered.

Figure 9:
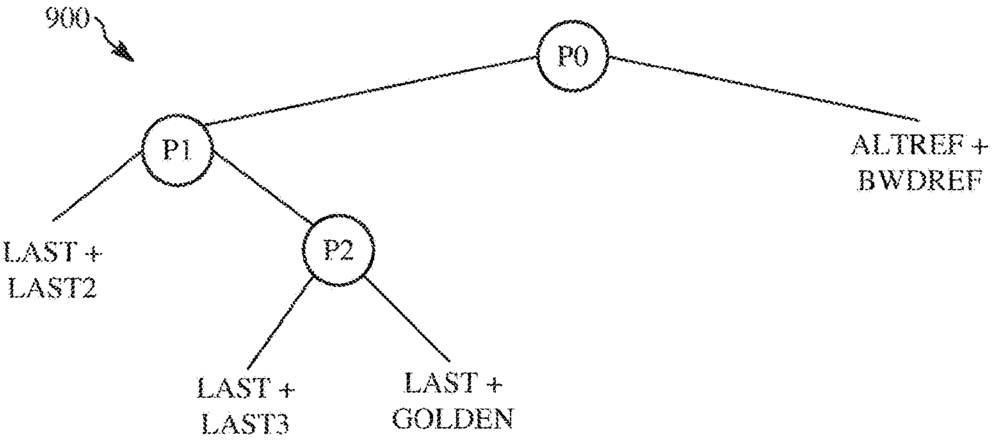
FIG. 9 is a diagram of an example of a context tree for entropy coding the frame identifiers for a block encoded using a unidirectional compound reference prediction mode.

For the compound reference prediction mode, a different syntax may be used when the current block is predicted bidirectionally (i.e., a combination of past and future reference frames is used for backwards and forward prediction) as compared to that used when the current block is predicted unidirectionally (i.e., past reference frames or future reference frames are used for prediction, but not both). FIG. 9 is a diagram of an example of a context tree 900 for entropy coding the frame identifiers for a block encoded using a unidirectional compound reference prediction mode. The context tree 900 describes a binary code for combinations of reference frame slots. Each node P0-P2 of the context tree is an entropy coded bit with a different probability model (e.g., a cumulative distribution function) and context. In other words, each node P0-P2 represents a different method of computing the context for the particular binary decision at the node P0-P2.

The contexts are computed using the context tree 900 with a similar strategy as described with respect to the context tree 800. That is, the context value at node P0 may be based on a comparison of the cardinality of forward reference frames used for coding adjacent blocks with the cardinality of backward reference frames used for coding the adjacent blocks. The count may be limited to those adjacent blocks also predicted using the compound reference prediction mode in some implementations. The full set of named frames may not be used to reduce the coding complexity. For example, ALTREF2 may be omitted from consideration in the unidirectional compound reference prediction mode as shown in the example of FIG. 9. The combinations of forward (e.g., past) reference frames, the combinations of backwards (e.g., future) reference frames, or both, may be limited to reduce the coding complexity in some implementations. For example, each of the combinations of two past reference frames used in the unidirectional compound reference prediction mode as shown in the example of FIG. 9 includes LAST. Accordingly, combinations of LAST2, LAST3, and GOLDEN are not included in the context tree 900.

Figure 10A:
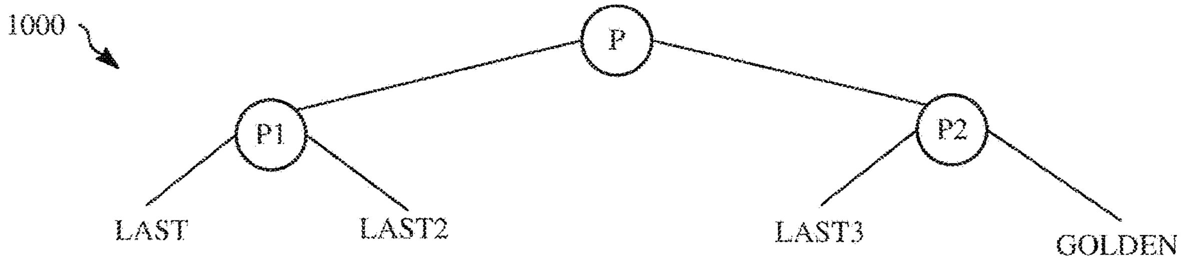
FIG. 10A is a diagram of an example of a context tree for entropy coding forward frame identifiers for a block encoded using a bidirectional compound reference prediction mode.
Figure 10B:
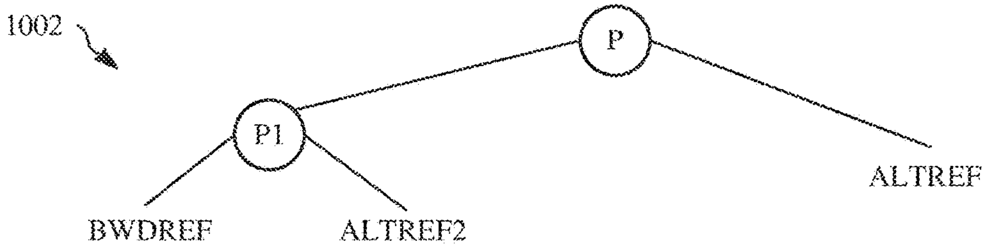
FIG. 10B is a diagram of an example of a context tree for entropy coding backwards frame identifiers for a block encoded using a bidirectional compound reference prediction mode.

In contrast to the context tree 800 for the single reference prediction mode illustrated with the example of FIG. 8 and the context tree 900 for the unidirectional compound reference prediction mode illustrated with the example of FIG. 9, there may be two context trees associated with the bidirectional compound reference prediction mode because the computed context does not need the comparison of the forward prediction and backward prediction frames of the adjacent blocks. FIG. 10A is a diagram of an example of a context tree 1000 for entropy coding forward frame identifiers for a block encoded using a bidirectional compound reference prediction mode, and FIG. 10B is a diagram of an example of a context tree 1002 for entropy coding backwards frame identifiers for a block encoded using a bidirectional compound reference prediction mode.

The context tree 1000 describes a binary code for a past reference frame slot. Each node P, P1, P2 of the context tree is an entropy coded bit with a different probability model (e.g., a cumulative distribution function) and context. In other words, each node P, P1, P2 represents a different method of computing the context for the particular binary decision at the node P, P1, P2.

At node P, for example, the cardinality of forward reference frames LAST and LAST2 used for coding the adjacent blocks and the cardinality of forward reference frames LAST3 and GOLDEN used for coding the adjacent blocks may be compared. The context value may be set to 0 where the cardinality of forward reference frames LAST and LAST2 is less than the cardinality of forward reference frames LAST3 and GOLDEN, the context value may be set to 1 where the cardinality of forward reference frames LAST and LAST2 is equal to the cardinality of forward reference frames LAST3 and GOLDEN, and the context value may be set to 2 where the cardinality of forward reference frames LAST and LAST2 is greater than the cardinality of forward reference frames LAST3 and GOLDEN. At node P1, for example, the cardinality of forward reference frame LAST used for coding the adjacent blocks and the cardinality of forward reference frame LAST2 used for coding the adjacent blocks may be compared. The context value may be set to 0 where the cardinality of forward reference frame LAST is less than the cardinality of forward reference frame LAST2, the context value may be set to 1 where the cardinality of forward reference frame LAST is equal to the cardinality of forward reference frame LAST2, and the context value may be set to 2 where the cardinality of forward reference frame LAST is greater than the cardinality of forward reference frames LAST2. At node P3, for example, the cardinality of forward reference frame LAST3 used for coding the adjacent blocks and the cardinality of forward reference frame GOLDEN used for coding the adjacent blocks may be compared. The context value may be set to 0 where the cardinality of forward reference frame LAST3 is less than the cardinality of forward reference frame GOLDEN, the context value may be set to 1 where the cardinality of forward reference frame LAST3 is equal to the cardinality of forward reference frame GOLDEN, and the context value may be set to 2 where the cardinality of forward reference frame LAST3 is greater than the cardinality of forward reference frame GOLDEN.

The context tree 1002 describes a binary code for a future reference frame slot. Each node P, P1, P2 of the context tree is an entropy coded bit with a different probability model (e.g., a cumulative distribution function) and context. In other words, each node P, P1, P2 represents a different method of computing the context for the particular binary decision at the node P, P1, P2. The contexts for each node of FIG. 10B may be determined in a similar manner as the nodes of FIG. 10A.

As can be seen from the above description, the use of named references and the associated reference mapping results in a relatively complicated determination of the probability model. This complicated determination is an acceptable tradeoff to improved accuracy of the probability model used to code the reference frame identifier. However, an encoder, such as the encoder 400, allows for the flexible selection of reference frames. The label-based identification of the buffers implies certain qualities or statistics about the associated reference frames. Due to the flexibility at the encoder, the actual reference frame associated with a reference frame label may not have the expected qualities or statistics. For example, a frame identified as LAST2 may correspond instead to what is described above as LAST3. This can reduce the accuracy of the probability models derived using the context trees. Further, the reference frame management scheme is relatively inflexible-additional reference frames cannot be added to without significant changes to the code.

The reference frame management scheme described herein includes ranking a list of n possible references without using named references/reference mapping. The ranking may be explained in more detail starting with FIG. 11, which describes an example of a process, technique, or method 1100 of coding one or more reference frames for an inter-predicted block. More specifically, the method 1100 describes coding syntax elements representing the one or more reference frames.

Figure 11:
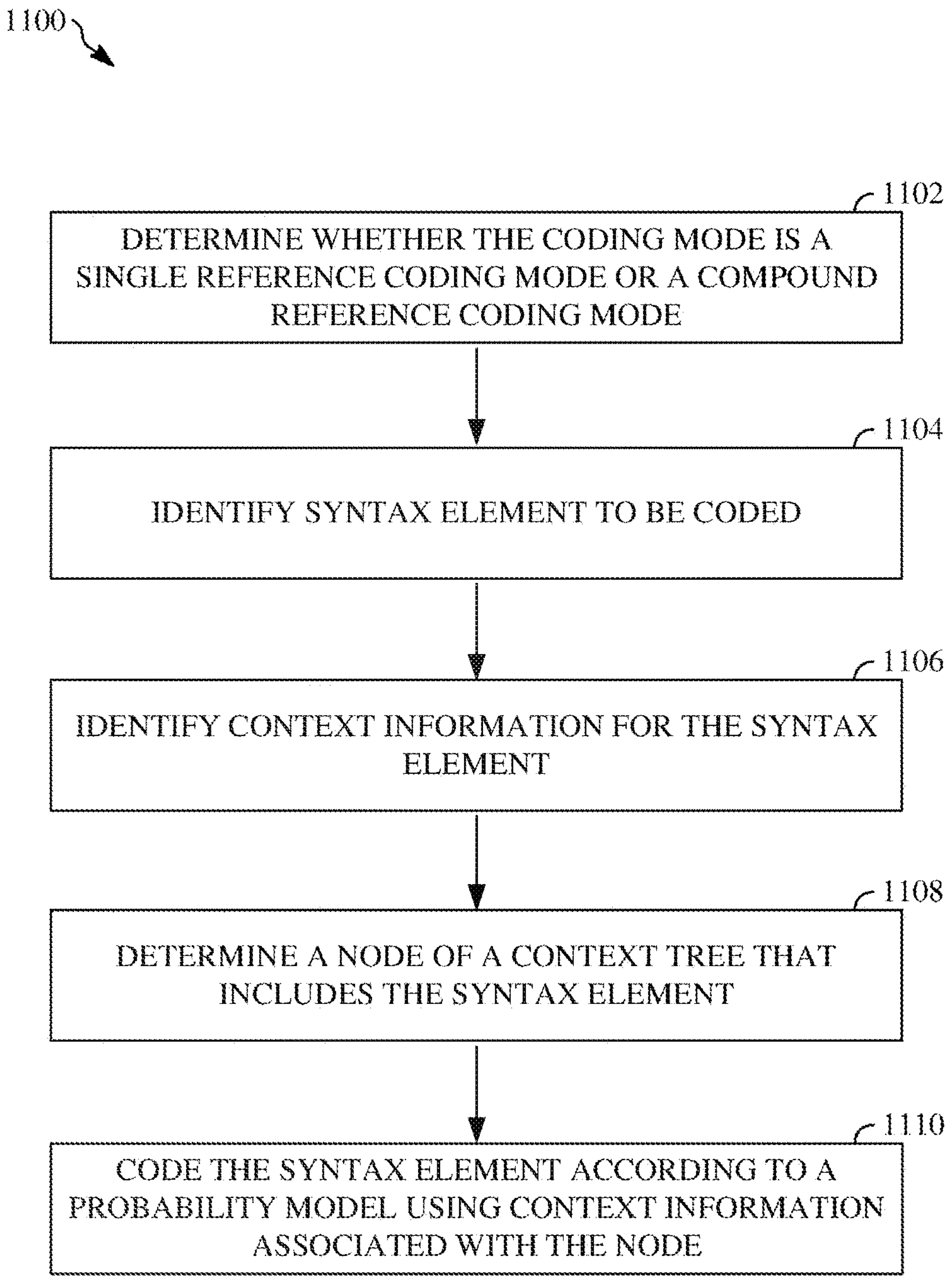
FIG. 11 is a flowchart diagram of a method of coding one or more reference frames for an inter-predicted block.

Initially, the method of FIG. 11 assumes that the inter-predicted block is a current block in the coding sequence. For example, if the method 1100 is performed as part of the encoding process, such as at the encoder 400, the current block, blocks before the current block in the block coding order of the current frame, if any, and (e.g., blocks of) any previous frame(s) in the frame coding order have already proceeded through inter-prediction, transformation, quantization, and where applicable reconstruction, such as through the reconstruction path of FIG. 4. Accordingly, the method 1100 may be implemented in whole or in part during entropy coding, such as in the entropy encoding stage 408 of the encoder 400 of FIG. 4. In another example, if the method 1100 is performed as part of the decoding process, such as at the decoder 500, the current block, blocks before the current block in the block coding order of the current frame, if any, and (e.g., blocks of) any previous frame(s) in the frame coding order have been received as part of an encoded bitstream, such as the compressed bitstream 420, the previously-coded blocks have been decoded, and processing has started for decoding the current block. In this latter example, the method 1100 may be implemented in whole or in part during entropy coding, such as in the entropy decoding stage 502 of the decoder 500 of FIG. 5.

The method 1100 can be implemented, for example, as a software program that may be executed by computing devices such as the transmitting station 102 or the receiving station 106 of FIG. 1. For example, the software program can include machine-readable instructions that may be stored in a memory such as the memory 204 or the secondary storage 214 of FIG. 2, and that, when executed by a processor, such as CPU 202 of FIG. 2, may cause the computing device to perform the method 1100. The method 1100 can be implemented using specialized hardware or firmware. Some computing devices may have multiple memories or processors, and the operations described in the method 1100 can be distributed using multiple processors, memories, or both. The method 1100 can be implemented using specialized hardware or firmware. Multiple processors, memories, or both, may be used.

At 1102, the method 1100 determines whether the coding mode used to code the current, inter-predicted block is the single reference coding mode or the compound reference coding mode. Thereafter, the syntax element to be coded is identified at 1104. In the examples described herein the syntax element is an identifier of the reference frame or identifiers of the reference frames used for coding the current block. At an encoder, this information may be passed to the entropy encoding stage for inclusion in the header of the current block. At a decoder, this information may be read from the header of the current block at the entropy decoding stage.

At 1106, context information for coding the syntax element may be identified. The context information may be syntax elements associated with previously-coded blocks. For example, the previously-coded blocks can include one or more blocks temporally adjacent to the current block within a previously-coded frame, one or more blocks spatially adjacent to the current block within the current frame, or some combination thereof. The context information may include values identifying the respective inter-coding modes (e.g., single reference or compound reference) and reference frames used to code the previously-coded blocks. The context information may be stored in and retrieved from a cache or other memory.

At 1108, a node of a context tree that includes the syntax element is determined. In the examples described above, the use of the named reference assignments/slots requires that a selection be made between multiple context trees. The frame level reference syntax in such a scheme includes, for example, an 8-bit flag that indicates which buffer(s) of the reference frame buffers, such as the reference frame buffers 600, to refresh with the current frame. The frame level reference syntax also includes a list of values indicating a mapping of buffers to the named reference assignments. For example, three bits each may be used be used to map the buffers to the, e.g., seven, respective named reference slots. These index values may be coded as literals.

Using the ranked reference framework described herein, the refresh bitmap and the reference mapping can be derived on the decoder side, as well as the encoder side. This eliminates the need to signal these values directly. Moreover, the ranked reference framework significantly simplifies the context tree. It is worth noting that the ranked reference framework described herein does not need to completely displace the named reference buffer system in all implementations. For example, different groups of frames of the same video stream to be encoded or decoded may use one or the other system. This may be achieved using, for example, a flag encoded into the header of key frames indicating whether reference frame ranking is enabled or not.

As mentioned initially, the ranked reference framework uses a heuristic designed to determine the usefulness of each possible reference frame, its likelihood in being a good choice for predicting blocks in the current frame (e.g., its likelihood of minimizing the residuals for the blocks), or some combination thereof. For example, studies of encoded blocks generally indicate that the temporal distance from the current frame is a strong indicator of the usefulness of a reference frame for prediction. Accordingly, in some implementations, the ranking may consider the temporal distance (i.e., the display order distances between the references and the current frame) as one of multiple frame statistics used to score a reference frame for the ranking. Other statistics may include but are not limited to, the quality or quantization level of the frames, the number of times a frame has been selected for reference, gradient information of the frames, or some combination thereof. For example, studies of encoded blocks generally indicate that the quality or quantization level of the frames is a strong indicator of the usefulness of a reference frame for prediction. In some implementations, the quality level may useful when multiple references have same or similar temporal distance. Further, the quality may be useful when multiple references are in the past (e.g., more than three frames away).

Each of the possible reference frames may be ranked using, for example, combinations of the differences between respective statistics of a reference frame and the current frame, between respective statistics of the reference frames, or some combination thereof. For example, a first reference frame may be ranked higher than a second reference frame where the first reference frame is closer to the current frame in the display order. For example, a first reference frame may be ranked higher than a second reference frame where the first reference frame is higher in quality than the second reference frame. For example, the first reference frame may be ranked higher than a second reference frame where gradient information of the first reference frame is closer to gradient information of the current frame than gradient information of the second reference frame. For example, a first reference frame may be ranked higher than a second reference frame where the first reference frame is used more than the second reference frame.

In an implementation, the distance between the current frame and the reference frame may be first used for ranking. To the extent reference frames have a same distance from the current frame, the following metric may be used for ranking, where a higher value for the variable score indicates that the reference frame is likely to be more useful for inter-prediction than a lower value for the variable score.

$$\text{score} = |D_C - D_R| * 2^{(L_R - L_C)} \quad (1)$$

In the above metric to determine score, $D_C$ is the display order number of the current frame, $D_R$ is the display order number of the reference frame, $L_R$ is the quality level of the reference frame, and $L_C$ is the quality level of the current frame. Because the absolute value of the difference between the display order numbers is determined, whether the reference frame is before or after the current frame in the display order is not relevant to the determination.

With regards to the quality level, a number of values associated with the frames may be used to indicate the quality level of a frame. In some implementations, the quality level may be determined by a quantizer value or quantization level of the frame. As described with regards to FIG. 4, a quantization stage, such as the quantization stage 406, divides transform coefficients of frame blocks by the quantizer value and then truncates the resulting values before entropy encoding. The higher the quantizer value or quantization level, the lower the quality level of the frame. Conversely, the lower the quantizer value or quantization level, the higher the quality level of the frame. For this reason, the quality level may be the inverse of the quantizer value or quantization level in some implementations, such as in the metric above to determine score. If the quality level $L_R$ of the reference frame is higher than the quality level $L_C$ of the current frame, the value of score is higher than where the quality level $L_R$ of the reference frame is lower than the quality level $L_C$ of the current frame.

In another implementation, the distance between the current frame and the reference frame may be first used for ranking, and the following metric may be used for ranking where reference frames have the same distance from the current frame. Again, a higher value for the variable score indicates that the reference frame is likely to be more useful for inter-prediction than a lower value for the variable score.

$$\text{score} = 64 * |D_C - D_R| + L_R \quad (2)$$

In an example of applying equations (1) and (2), if three reference frames are available, one reference frame is located next to the current frame, and two reference frames are spaced from the current frame by a frame, the adjacent reference frame would be ranked highest, and the two remaining reference frames would have a score calculated according to equation (1) or equation (2). Whichever has a higher value for score would be ranked second and the other would be ranked third.

In yet another implementation, the following metric may be used for ranking the reference frames.

$$\text{score} = f(|D_C - D_R|) + Q_R \quad (3)$$

In this metric, $Q_R$ is the quality level of the reference frame. The score may be determined by taking a function of the absolute value of the difference between the display order numbers. In some implementations, the function may be a concave function. For example, the function $f(x)$ may be a monotonically increasing concave function as depicted in the following table.

TABLE 1

| x | 0 | 1 | 2 | 3 | 4 | 5 | 6 | 7 | 8 | 9 | . . . |
|---|---|---|---|---|---|---|---|---|---|---|---|
| f(x) | 0 | 64 | 96 | 112 | 120 | 124 | 126 | 127 | 128 | 129 | . . . |

In this metric, a lower value for the variable score indicates that the reference frame is likely to be more useful for inter-prediction than a higher value for the variable score. With regards to the quality level $Q_R$, as with $L_R$, a number of values associated with the frames may be used to indicate the quality level of the reference frame. In some implementations, the quality level may be determined by a quantizer value or quantization level of the reference frame as described previously. In contrast to $L_R$ in equations (1) and (2), however, the quality level $Q_R$ is higher for frame of lesser quality and lower from a frame of greater quality in equation (3). Accordingly, the value for $Q_R$ may be the quantizer value or quantization level itself or a representative thereof, such as a base frame value used coding other quantizers (e.g., as opposed to an inverse of this value or level). The ranking may be completed using, for example, a simple bubble sort.

In yet another implementation, the following metric may be used for ranking the reference frames.

$$\text{score} = 64 * |D_C - D_R| + L_R \quad (4)$$

Like equation (3), a lower value for the variable score indicates that the reference frame is likely to be more useful for inter-prediction than a higher value for the variable score. The ranking may be completed using, for example, a simple bubble sort.

According to the above, temporal distance is a strong indicator of the reference frame's usefulness. Aside from temporal distance, the quality of the reference frame may be considered, particularly when multiple references have the same or similar temporal distance from the current frame. In some implementations, the number of past reference frames as compared to the total number of frames may be relevant. For example, in a low delay configuration or when encoding the forward keyframe in random access, multiple reference frames may be from the distant past (e.g., more than 3 frames away). This may make quality more important for such frames and may make it desirable to calculate score differently depending on the cardinality of past reference frames and/or the cardinality of the future reference frames. In an implementation, equations (3) and (4) may both be used. For example, equation (3) may be used to calculate score where all reference frames are from the past, and equation (4) may be otherwise used to calculate score.

These same principles may be useful if the number of available reference frames is greater than the number of reference slots, such as where 8 reference frames are available for 7 active reference slots. Deciding which reference frames to use may include computing an average quality level for all available reference frames (using $Q_R$, for example). If there are more past reference frames than future reference frames, then the worst scoring (e.g., highest value for score) past reference frame whose quality level indicates that it is a lower quality frame than the average (e.g., its quality level $Q_R$ is above the average quality level) will be omitted. Otherwise, the worst scoring future reference frame whose quality level indicates that it is a lower quality frame than the average (e.g., its quality level $Q_R$ is above the average quality level) will be omitted.

Once blocks of frame of a group of frames are reconstructed, the reconstructed frame is available for use as a reference frame to code further frames. Each of the reference frames available for inter-prediction of blocks of the current frame may be considered using the ranking up to a maximum number of reference frames available per frame. For encoding or decoding a group of frames, all reference frames buffers may be refreshed upon receipt of the first (e.g., the key) frame. For the next frame in the coding sequence, the subsequent frame is available for inter-prediction of its blocks, and so on. As reconstructed frames are available for reference, they are added to buffers, such as the reference frame buffers 600, and the scoring is recalculated to map the reference frames to their rank.

In some implementations, the ranked reference frames may be used for faster encoder decisions by eliminating reference frames from the search for the best prediction mode using rate-distortion techniques. For compound prediction, for example, if the ranks of two reference frames are higher than or equal to 4 (i.e., their rank is 4, 5, 6, 7), the combination using both reference frames may not be considered by the encoder. As mentioned above, the direction of a reference frame may be relevant to coding decisions. Accordingly, the reference frames may be separately ranked in directional lists-one for past reference frames and one for future reference frames, each frame in each list having a directional rank based on the value of score. If the prediction is unidirectional for a compound prediction mode of a current block, combinations where the directional ranks are both higher than 2 may be omitted. Otherwise (the prediction is bi-directional), combinations where both reference frames have directional ranks higher than 3 may be omitted. A special case may be made when all references are from the past. Under such circumstances, those combinations where the directional ranks are both higher than 4 may be omitted so that more searching is performed than the general case.

As mentioned above, the ranked reference framework allows for a simplified context determination. One reason for this simplified determination is because there is no distinction between past and future reference frames in the ranked reference framework. Thus, the same context tree may be used for each reference frame that is used to code a block. In some implementations, the same syntax structure may be used for coding reference frame identifiers for both the single reference prediction mode and the compound reference prediction mode. An example of the syntax structure of a context tree 1200 that may be used to code identifiers where the ranked reference framework is implemented as shown in FIG. 12.

Figure 12:
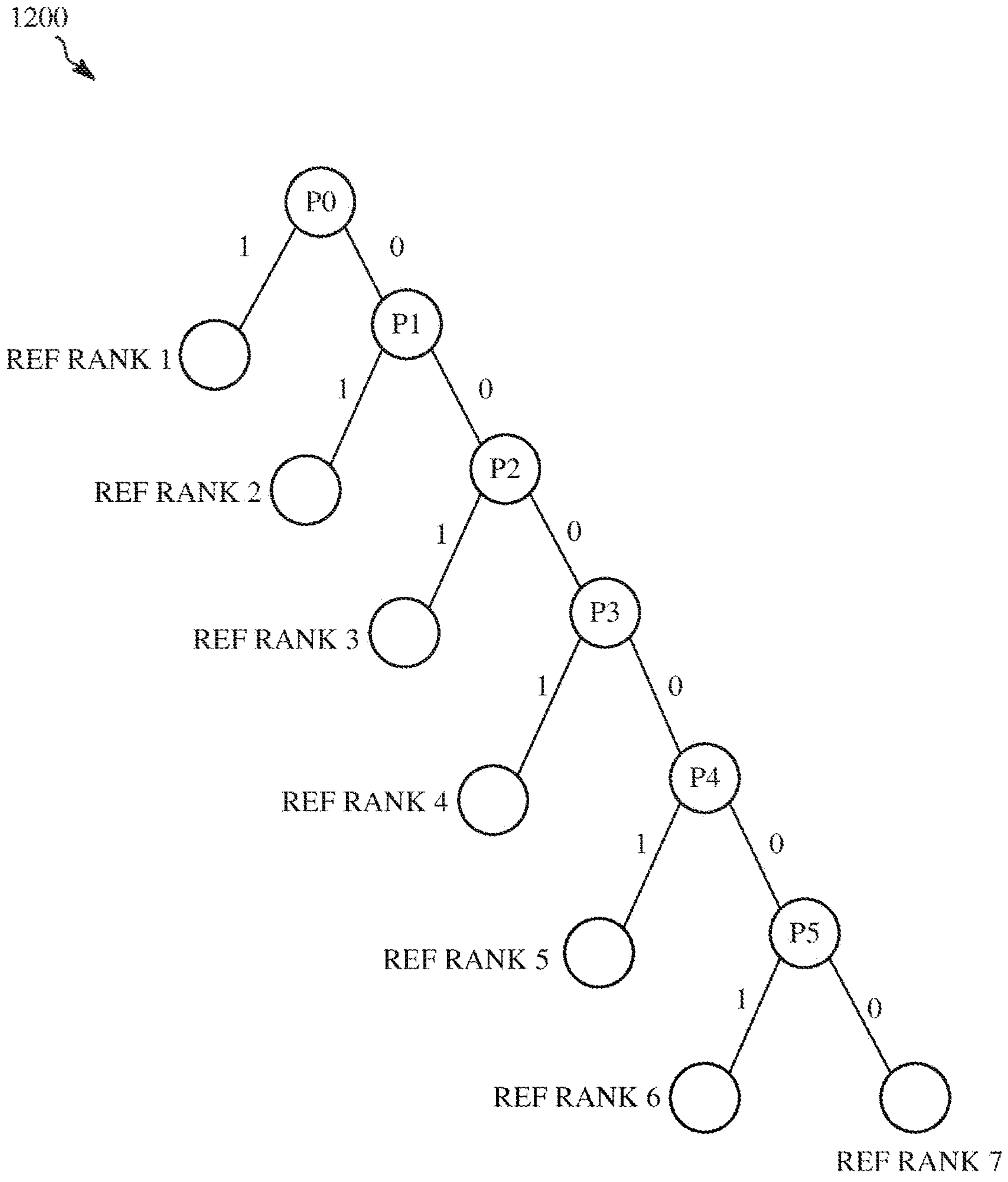
FIG. 12 is a diagram of an example of a context tree for entropy coding one or more reference frames for an inter-predicted block.

The context tree 1200 at FIG. 12 may be used to explain how, at 1108, the node of a context tree that includes the syntax element is determined. The context tree 1200 is a binary tree that determines a rice code for entropy coding. In the context tree 1200, the highest ranked reference frame is labeled REF RANK 1, the next highest ranked reference frame is labeled REF RANK 2, the next highest ranked reference frame is labeled REF RANK 3, and so on until the lowest ranked reference frame, namely REF RANK7, is labeled. For example, because the context tree 1200 is a binary tree, values of the context information can be resolved against separation criteria at each tree level as true (1) or false (0). This example assumes that there are seven available reference frames, but fewer or additional reference frames may be used.

A single reference prediction mode is first described. At node P0, it is determined whether the reference frame used to code the current block corresponds to that identified with the label REF RANK 1. If so, the code 1 is used for entropy coding. If not, consideration is given at node P1 as to whether the reference frame used to code the current block corresponds to that identified with the label REF RANK 2. If so, the code 01 is used for entropy coding. If not, consideration is given at node P2 as to whether the reference frame used to code the current block corresponds to that identified with the label REF RANK 3. If so, the code 001 is used for entropy coding. If not, consideration is given at node P3 as to whether the reference frame used to code the current block corresponds to that identified with the label REF RANK 4. If so, the code 0001 is used for entropy coding. If not, consideration is given at node P4 as to whether the reference frame used to code the current block corresponds to that identified with the label REF RANK 5. If so, the code 00001 is used for entropy coding. If not, consideration is given at node P5 as to whether the reference frame used to code the current block corresponds to that identified with the label REF RANK 6. If so, the code 000001 is used for entropy coding. If not, the reference frame used to code the current block corresponds to that identified with the label REF RANK 7, and the code 000000 is used for entropy coding.

At 1110, the syntax element is coded according to a probability model using the context information associated with the node determined at 1108. The cumulative distribution function (e.g., resulting from the probability model for each node) may be determined using context values with the code for the node. The context values are determined for each node, which context values may be determined using the context information identified at 1106. For example, at node P0, the context value is 0 if the cardinality of reference frames used by adjacent blocks identified as REF RANK 1 is less than a sum of the respective cardinalities of each of the reference frames identified as REF RANK 2 through REF RANK 7, the context value is 1 if the cardinality of reference frames used by adjacent blocks identified as REF RANK 1 is equal to the sum, and the context value is 2 if the cardinality of reference frames used by adjacent blocks identified as REF RANK 1 is greater than the sum. At node P1, the context value is 0 if the cardinality of reference frames used by adjacent blocks identified as REF RANK 2 is less than a sum of the respective cardinalities of each of the reference frames identified as REF RANK 3 through REF RANK 7, the context value is 1 if the cardinality of reference frames used by adjacent blocks identified as REF RANK 2 is equal to the sum, and the context value is 2 if the cardinality of reference frames used by adjacent blocks identified as REF RANK 2 is greater than the sum. Stated more generally, for each node, the context value for each node may be determined according to the following table, where N is the total number of ranked references, n is the reference frame ranking associated with the current node and n=1 to N−1.

| Context Value | Condition |
|---|---|
| 0 | rank n < sum(rank n + 1: rank 7) |
| 1 | rank n == sum(rank n + 1: rank 7) |
| 2 | rank n > sum(rank n + 1: rank 7) |

In some implementations, the reference frame context information identified at 1106 and used in the determination of the context values may be limited to that from those adjacent blocks predicted using the single reference prediction mode.

The nodes of the context tree 1200 are each associated with a probability model. The probability model associated with a node can reflect probabilities for the syntax element of that node. A probability model can indicate the probability that the syntax element associated with the current block of the video frame will be a certain value (e.g., that the reference frame used to predict the current block is a particular reference frame). In an example, the probability model can include integer values reflecting the different probabilities that may be associated with each bit of the code representing the syntax element. A maximum value can be defined for the probability model such that a given probability can be represented as a percentage derived by dividing an integer value with the maximum value.

During an encoding operation, and after the entropy coding (e.g., Golomb-Rice coding) is performed against the syntax element according to the identified probability model, the resulting code is included in the current block header within the encoded bitstream. Alternatively, during a decoding operation, the coded syntax elements are obtained from the current block header within the encoded bitstream to perform the arithmetic coding against the syntax element according to the identified probability model to identify the reference frame(s) and decode the encoded block.

Referring back to 1108, determining a node for each syntax element (e.g., respective identifiers of reference frames) where the compound reference prediction mode is used may be performed at 1108 using the same syntax structure as the context tree 1200, but with different cumulative distribution functions for the nodes for the coding at 1110. The lowest ranked reference frame may be coded first, in the same manner as described above for a single reference frame. The second reference frame may be coded by continuing down the syntax tree 1200 from the node for the first reference frame. For example, if the compound reference prediction mode for the current block uses {REF RANK 2, REF RANK 5}, the code 01001 is used for entropy coding. The reference frame context information used in the determination of the context values may be limited to that from those adjacent blocks predicted using the compound reference prediction mode.

The method according to FIG. 11 may be performed for each block of a current frame being coded using inter-prediction.

Although each of these examples describes that neighboring (or adjacent blocks) may be used to identify the context information at 1106, the teachings herein are not limited to this technique. For example, the context information may be accumulated using those blocks that are inter-predicted as each block of the frame is coded in the coding order (e.g., raster scan order).

The use of the ranked reference framework provides additional benefits over the simplification of entropy coding and the ability to eliminate the frame headers required for coding reference frames (i.e., the refresh bitmap and the reference mapping). For example, the ranked reference list may be used to speed up encoding algorithms by allowing an encoder to skip modes searches for the reference frames ranked lower in the list.

The above examples of the ranked reference framework use seven reference frames. However, the processing for fewer or additional reference frames over the seven described is relatively simple because the determination of nodes in a context tree and the determination of context values would be substantially similar. The ranked reference framework allows flexibility in the number of reference available on a frame-by-frame and block-by-block basis. On a frame-by-frame basis, this could be achieved by signaling (e.g., in a frame header) the maximum number of reference frames to include in the ranking. Alternatively or additionally, the block level syntax may be improved in cases where all available references for a given frame are not used. In this case, for example, the frame header may include a syntax, such as a mask, indicating which of the reference frames the blocks may use. For example, a 7-bit mask may indicate to use a reference frame (1) and to not use a reference frame (0). In some implementations, a segment header or block header may include a syntax, such as a mask, indicating which of the reference frames the segment or block may use, similar to that described for the frame header. Reference frames may be removed when they are not useful such that, for example, one block of a frame is limited to four reference frames while another is limited to two reference frames.

The new reference framework described herein ranks reference frames based on a normative procedure (e.g., a calculated score) and signals the reference frames based on their ranks. The bitstream syntax is simplified by using a context tree that relies on the ranking. Moreover, mapping reference frames to buffers does not have to be signaled and can be determined at the decoder.

For simplicity of explanation, the methods described herein, such as the method 1100 of FIG. 11 and its variations, are depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for coding an identifier of at least one reference frame used to code a current block of a video frame, the apparatus comprising a processor configured to:

identify a syntax element to be coded, wherein the syntax element corresponds to the identifier;

determine context information for the syntax element, wherein the context information includes those reference frames of available reference frames that were used to code blocks before the current block in a coding order;

determine a node of a context tree that includes the syntax element, wherein the context tree is a binary tree that includes, as nodes, the available reference frames arranged in a ranking based on a score calculated for each reference frame using at least one statistic associated with the reference frame, wherein the score indicates whether the reference frame is likely to encode the current block more efficiently than another reference frame; and select, for the node, a probability model for entropy coding the syntax element from among a plurality of probability models using the context information;

code the syntax element according to the probability model.

2. The apparatus of claim 1, wherein the at least one statistic comprises at least two different statistics.

3. The apparatus of claim 1, wherein the processor is configured to:

determine whether a coding mode for the current block is a single reference coding mode or a compound reference coding mode, wherein the context tree has a same syntax structure whether the coding mode for the current block is the single reference coding mode or the compound reference coding mode.

4. The apparatus of claim 1, wherein the available reference frames included in the context tree include forward reference frames and backward reference frames.

5. The apparatus of claim 1, wherein:

the context tree is a single context tree that includes forward reference frames and backward reference frames;

a coding mode for the current block is a compound reference coding mode;

the identifier comprises a first identifier of a first reference frame and a second identifier of a second reference frame;

to identify the syntax element to be coded comprises to identify a first syntax element that corresponds to the first identifier and to identify a second syntax element that corresponds to the second identifier;

to determine the node comprises to determine a first node of the single context tree that includes the first syntax element and to determine a second node of the single context tree that includes the second syntax element;

to determine the context information for the syntax element comprises to determine first context information for the first syntax element and to determine second context information for the second syntax element; and to code the syntax element comprises to code the first syntax element according to a first probability model using the first context information and to code the second syntax element according to a second probability model using the first context information.

6. The apparatus of claim 1, wherein the at least one statistic comprises a quality level of the reference frame of the available reference frames being ranked and a temporal distance of the reference frame from the video frame including the current block.

7. The apparatus of claim 1, wherein a frame header of the video frame including the current block includes a mask with a number of bits equal to a cardinality of the available reference frames, the mask indicating which of the available reference frames the current block may use for inter-prediction and which of the available reference frames the current block may not use for inter-prediction.

8. A method for decoding a current block of a video frame, the method comprising:

ranking a list of available reference frames according to at least one statistic associated with each reference frame;

decoding, from a block header of the current block, an identifier of at least one reference frame used to encode the current block using a context tree, wherein the context tree is a single binary tree having nodes arranged from a highest ranked reference frame of the available reference frames to a lowest ranked reference frame of the available reference frames, wherein decoding the identifier comprises:

selecting, for a node of the context tree that includes the identifier, a probability model from among a plurality of probability models using context information associated with the node; and entropy decoding the identifier according to the probability model; and decoding the current block using the at least one reference frame.

9. The method of claim 8, wherein the at least one statistic associated with each reference frame indicate whether the reference frame is likely to encode the current block more efficiently than another reference frame.

10. The method of claim 8, wherein the at least one statistic comprises at least two of a temporal distance from the video frame that includes the current block, a quality or quantization level of the reference frame, a number of times the reference frame has been selected for inter-prediction, or gradient information of the reference frame.

11. A method for encoding a current block of a video frame, the method comprising:

ranking a list of available reference frames based on a score calculated for each reference frame using at least one statistic associated with the reference frame that indicates whether the reference frame is likely to encode the current block more efficiently than another reference frame;

encoding the current block using at least one reference frame of the available reference frames; and encoding, into a block header of the current block, an identifier of at least one reference frame used to encode the current block using a context tree, wherein the context tree is a single binary tree having nodes arranged from a highest ranked reference frame of the available reference frames to a lowest ranked reference frame of the available reference frames, wherein the identifier is encoded using a probability model selected from among a plurality of probability models using context information associated with a node of the context tree that includes the identifier.

12. The method of claim 11, wherein encoding the current block comprises:

encoding the current block multiple times using a single reference coding mode and each of the available reference frames omitting at least the lowest ranked reference frame; and selecting the at least one reference frame as the single reference frame of the available reference frames with a highest coding efficiency.

13. The method of claim 11, wherein encoding the current block using at least one reference frame comprises encoding the current block using two reference frames, and wherein encoding the identifier includes encoding a first identifier of a first reference frame of the two reference frames using the single binary tree and encoding a second identifier of a second reference frame of the two reference frames using the single binary tree.

14. The method of claim 11, wherein the available reference frames of the single binary tree include forward reference frames and backward reference frames.

15. An apparatus comprising a processor configured to perform the method of claim 11.

16. An apparatus, comprising:

a processor; and memory storing instructions that, when executed, cause the processor to perform the method of claim 8.

17. The method of claim 8, comprising:

determining whether a coding mode for the current block is a single reference coding mode or a compound reference coding mode, wherein the context tree has a same syntax structure whether the coding mode for the current block is the single reference coding mode or the compound reference coding mode.

18. The method of claim 8, wherein:

the available reference frames include at least one forward reference frame and at least one backward reference frame;

a coding mode for the current block is a compound reference coding mode; and the identifier comprises a first identifier of a first reference frame and a second identifier of a second reference frame.

19. The method of claim 8, wherein the at least one statistic comprises a quality level of a reference frame of the available reference frames being ranked and a temporal distance of the reference frame from the video frame including the current block.

20. The method of claim 8, wherein a frame header of the video frame including the current block includes a mask with a number of bits equal to a cardinality of the available reference frames, the mask indicating which of the available reference frames the current block may use for inter-prediction and which of the available reference frames the current block may not use for inter-prediction.

* * * * *